(12) United States Patent
Paparatto et al.

(10) Patent No.: US 7,101,526 B2
(45) Date of Patent: Sep. 5, 2006

(54) CATALYST AND ITS USE IN THE SYNTHESIS OF HYDROGEN PEROXIDE

(75) Inventors: Giuseppe Paparatto, Cinisello Balsamo (IT); Giordano De Alberti, Besnate (IT); Rino D'Aloisio, Novara (IT); Roberto Buzzoni, San Mauro Torinese (IT)

(73) Assignees: ENI S.p.A., Rome (IT); Polimeri Europa S.p.A., Brindisi (IT)

( * ) Notice: Subject to any disclaimer, the term of this patent is extended or adjusted under 35 U.S.C. 154(b) by 130 days.

(21) Appl. No.: 10/485,629

(22) PCT Filed: Jul. 30, 2002

(86) PCT No.: PCT/EP02/08546

§ 371 (c)(1),
(2), (4) Date: Jan. 30, 2004

(87) PCT Pub. No.: WO03/014014

PCT Pub. Date: Feb. 20, 2003

(65) Prior Publication Data

US 2004/0184983 A1 Sep. 23, 2004

(30) Foreign Application Priority Data

Aug. 2, 2001 (IT) .......................... MI2001A1688

(51) Int. Cl.
*C01B 15/029* (2006.01)
*B01J 31/06* (2006.01)
(52) U.S. Cl. ..................................... 423/584; 502/150
(58) Field of Classification Search ................ 423/584; 502/150
See application file for complete search history.

(56) References Cited

U.S. PATENT DOCUMENTS

| | | | | |
|---|---|---|---|---|
| 3,714,342 A | | 1/1973 | Kabisch | |
| 4,001,385 A | * | 1/1977 | Sanders | 423/576.7 |
| 4,336,238 A | * | 6/1982 | Dalton et al. | 423/584 |
| 4,772,458 A | * | 9/1988 | Gosser et al. | 423/584 |
| 4,832,938 A | | 5/1989 | Gosser et al. | |
| 4,889,705 A | * | 12/1989 | Gosser | 423/584 |
| 5,082,647 A | * | 1/1992 | Chuang | 423/584 |
| 5,180,573 A | * | 1/1993 | Hiramatsu et al. | 423/584 |
| 6,210,651 B1 | | 4/2001 | Herrmann et al. | |
| 6,284,213 B1 | * | 9/2001 | Paparatto et al. | 423/403 |
| 6,375,920 B1 | * | 4/2002 | Fischer et al. | 423/584 |
| 6,387,346 B1 | * | 5/2002 | Bertsch-Frank et al. | 423/584 |
| 6,630,118 B1 | * | 10/2003 | Paparatto et al. | 423/584 |
| 6,649,140 B1 | * | 11/2003 | Paparatto et al. | 423/584 |
| 2001/0016187 A1 | * | 8/2001 | Zhou et al. | 423/582 |
| 2001/0024634 A1 | * | 9/2001 | Bertsch-Frank et al. | 423/584 |
| 2003/0162657 A1 | * | 8/2003 | Paparatto et al. | 502/339 |
| 2004/0037770 A1 | * | 2/2004 | Fischer et al. | 423/584 |
| 2004/0126312 A1 | * | 7/2004 | Butz et al. | 423/584 |

FOREIGN PATENT DOCUMENTS

| | | |
|---|---|---|
| EP | 0 100 119 | 2/1984 |
| EP | 0 366 419 | 5/1990 |
| EP | 0 492 064 | 7/1992 |
| EP | 1 160 196 | 12/2001 |
| WO | 98 16463 | 4/1998 |
| WO | 99 02264 | 1/1999 |

\* cited by examiner

*Primary Examiner*—Wayne A. Langel
(74) *Attorney, Agent, or Firm*—Oblon, Spivak, McClelland, Maier & Neustadt, P.C.

(57) ABSTRACT

The present invention relates to a catalyst consisting of: (a) one or more metals of the platinum group as active components; (b) one or more polyolefins; and (c) a carrier. The invention also relates to a process for the synthesis of hydrogen peroxide ($H_2O_2$) from hydrogen and oxygen which uses said catalyst and the use of the hydrogen peroxide solution in oxidation processes catalyzed by titanium silicalite. The process operates under high safety conditions with a high productivity and molar selectivity towards the formation of $H_2O_2$.

70 Claims, No Drawings

CATALYST AND ITS USE IN THE SYNTHESIS OF HYDROGEN PEROXIDE

The present invention relates to a new catalyst, a process for the direct synthesis of hydrogen peroxide ($H_2O_2$) from hydrogen and oxygen which uses said catalyst and the use of the hydrogen peroxide solution in oxidation processes catalyzed by titanium-silicalite.

Hydrogen peroxide is a commercially important compound which is widely applied as a bleach in the textile and paper industry, as a biocide in the environmental sector and in the chemical industry in oxidation processes.

Examples of these oxidation processes are those using titanium silicalite as catalysts, such as the epoxidation of olefins (EP 100,119), the ammoximation of carbonyl compounds (U.S. Pat. No. 4,794,198), the oxidation of ammonia to hydroxylamine (U.S. Pat. No. 5,320,819) and the hydroxylation of aromatic hydrocarbons (U.S. Pat. No. 4,369,783).

The industrial production of aqueous solutions of $H_2O_2$ by means of a complex two-step process, is known.

In this process, a solution of anthraquinone, such as butylanthraquinone or ethylanthraquinone, in an organic medium immiscible with water, is first hydrogenated and then oxidized with air to produce $H_2O_2$ which is subsequently extracted in aqueous phase.

This process, however, has substantial disadvantages deriving from the necessity of operating with large volumes of reagents, the numerous steps required, the relatively high cost of the intermediates and the formation of by-products.

In order to overcome these drawbacks, processes have been studied for the direct synthesis of hydrogen peroxide from $H_2$ and $O_2$. These processes are generally carried out by reacting the two gases in a solvent consisting of an aqueous medium or an aqueous-organic medium, in the presence of a suitable catalytic system.

Among processes of this type, those which operate in an alcohol or alcohol-aqueous medium, for example in methanol or in methanol-water described, for example, in U.S. Pat. No. 4,335,092, in patent application WO 98/16463, in European patent application EP 787681 and more particularly in European patent application EP 978316 and in Italian patent applications MI 2000 A001218, MI 2000 A001219 and MI 2000 A001881, appear attractive from an technical and economic point of view.

With the same conditions in fact, higher reaction rates and selectivities have been observed with respect to when operating in an aqueous medium.

The high reaction performances lead in turn to:
i) the possibility of carrying out the process under high safety conditions, well outside the explosivity zone of $H_2$—$O_2$ mixtures, without jeopardizing it from a technical-economic point of view;
ii) the possibility of using extremely low quantities of promoters (halides and acids) in the reaction medium, with beneficial effects on the stability of the catalytic system and formation of hydrogen peroxide solutions which are stable and at an adequate concentration for direct and economically valid use in oxidation processes.

Finally, the concentration of the solutions of hydrogen peroxide produced is facilitated up to commercially useful values, as the boiling point and evaporation heat of the suitably selected alcohol are lower than those of water.

These processes are generally carried out in the presence of a catalytic system consisting of a noble metal, particularly metals of the platinum group or their mixtures, in the form of salts or as supported metals.

It has now been found that it is possible to further improve these processes, in terms of selectivity and cost, using a heterogeneous catalyst consisting of one or more metals of the platinum group, one or more polyolefins and a carrier.

The use of polyolefins also allows the mechanical properties of the catalyst to be improved and facilitates its filtration from the reaction mixture.

An objective of the present invention therefore relates to a heterogeneous catalyst consisting of one or more metals of the platinum group, one or more polyolefins and a carrier.

Another objective of the present invention relates to a process for the production of hydrogen peroxide starting from hydrogen and oxygen, which uses said catalyst.

A further objective of the present invention relates to the use of solutions of hydrogen peroxide obtained as described above in an oxidation process catalyzed by titanium silicalite.

The catalyst which can be used for the purposes of the invention is a heterogeneous catalyst consisting of:
(a) one or more metals of the platinum group as active components;
(b) one or more polyolefins; and
(c) a carrier.

Examples of metals of the platinum group are: palladium, platinum, ruthenium, rhodium and iridium. Preferred metals are palladium and platinum.

In these catalysts, the palladium is normally present in a quantity ranging from 0.01 to 4% by weight and the platinum in a quantity ranging from 0.001 to 1% by weight, with an atomic ratio between platinum and palladium ranging from 0.1/99.9 to 50/50.

The palladium is preferably present in a quantity ranging from 0.05 to 2% by weight and the platinum in a quantity ranging from 0.005 to 0.5% by weight, with an atomic ratio between platinum and palladium ranging from 1/99 to 30/70.

In addition to palladium and platinum, other metals such as ruthenium, rhodium, iridium and gold can be present as active components or promoters, in a concentration generally not higher than that of the palladium.

The polyolefins which can be used in the process of the present invention have a molecular weight higher than 400 and are selected from:
homopolymers of ethylene and copolymers of ethylene with alpha olefins;
homopolymers of propylene and copolymers of propylene with alpha olefins;
homopolymers of butadiene and copolymers with styrene and other olefins;
homopolymers of isoprene and copolymers with other olefins; ethylene/propylene (EPR) copolymers;
ethylene/propylene/diolefin (EPDM) terpolymers;
thermoplastic elastomers deriving from butadiene and/or isoprene and styrene block copolymers, hydrogenated and non-hydrogenated.

The preferred polyolefins are amorphous polyolefins as they are more soluble and therefore easier to disperse on the carrier.

For the purposes of the present invention rubbers are particularly preferred, and, in general, commercial copolymers of butadiene-styrene (synthetic rubber; GRS, SBR); ethylene-propylene (EPM, EPR) copolymers, ethylene-propylene-diene copolymers (EPDM rubbers), styrene-butadiene-styrene (SBR thermoplastic rubbers); isobutylene-isoprene (butyl rubbers).

The polyolefins which can be used for the purposes of the present invention can be prepared according to any of the methods known in the art.

The quantity of polyolefin used ranges from 0.1 to 20% by weight, preferably from 1 to 10% by weight, with respect to the catalyst.

The inert carrier may typically consist of activated carbon, silica, alumina, silica-alumina, zeolites, and other materials well known in the state of the art. Activated carbon is preferably used for the preparation of the catalysts useful for the invention.

Activated carbons which can be used for the purposes of the invention are selected from those of a fossil or natural origin deriving for example from wood, lignite, peat or coconut and having a surface area higher than 100 m$^2$/g, preferably higher than 300 m$^2$/g and a carbon with a surface area higher than 600 m$^2$/g is particularly preferred. Preferred activated carbons are those with a low ash content.

The sulfonated activated carbons described in European patent application EP 978316 can be used for the purpose.

Before the deposition of the metals or polyolefins, the activated carbon can be subjected to treatment such as washing with distilled water or treatment with acids, bases or diluted oxidizing agents, for example acetic acid, hydrochloric acid, sodium carbonate and hydrogen peroxide.

The catalyst can be prepared by dispersing the active components on the inert carrier or pretreated with the polyolefin, by means of precipitation and/or impregnation starting from precursors consisting for example of solutions of their salts or soluble complexes, and then reduced to the metallic state by means of thermal and/or chemical treatment with reducing substances such as hydrogen, sodium formiate, sodium citrate or by preparative techniques well known in the art.

According to an embodiment of the present invention, the catalyst can be prepared by dispersing in sequence and alternating the precursors of the single metal components of the catalyst onto the carrier, as described and claimed in patent application IT MI2000-A001219.

The polyolefin is generally dissolved in a suitable solvent and the resulting solution is used to impregnate the carrier.

The dry impregnation technique is preferably used, which consists in putting the polyolefin mixture in contact with the carrier, in a closed reactor at 100–120° C., for 2–3 hours, in order to facilitate the depositing of the polymer onto the surface. At the end, the solvent is evaporated at a temperature of 140° C. for 3–4 hours.

Examples of solvents suitable for the purposes of the present invention are selected from paraffins, aromatic hydrocarbons and cyclo-paraffins. N-heptane, toluene, decaline, n-decane are preferably used.

In the preparation of the catalyst, the sequence with which the metals of the platinum group (a) and polyolefins (b) are put in contact with the carrier, is not particularly critical.

When a quantity of polyolefins higher than 5% by weight is used, however, it is preferable to disperse the mixture of polyolefins onto the carrier after depositing the metals forming the active phase.

The catalyst of the present invention is particularly advantageous in a process for the preparation of hydrogen peroxide from hydrogen and oxygen in a reaction solvent containing a halogenated promoter and/or an acid promoter.

The catalyst is normally dispersed in the reaction medium at a concentration ranging from 0.1 to 10% by weight, preferably from 0.3 to 3% by weight with respect to the reaction solvent.

The reaction solvent consists of one or more alcohols or an alcohol-water mixture to which an aliphatic ether and/or one or more $C_5$–$C_{32}$ hydrocarbons are optionally added.

Examples of alcohols suitable for the purposes of the present invention are selected from those with from 1 to 6, preferably from 1 to 4, carbon atoms.

Among $C_1$–$C_4$ alcohols, methanol, ethanol, terbutanol (TBA) or their mixtures, are preferred. Methanol is particularly preferred. Among the preferred mixture is a mixture of methanol and water.

The quantity of alcohol(s) ranges from 30 to 99% by weight with respect to the mixtures, preferably from 50 to 98% by weight.

The aliphatic ethers are selected from those having general formula (I)

$$R\text{—}O\text{—}R_1 \tag{I}$$

wherein R and $R_1$, the same or different, are alkyl groups with from 1 to 6 carbon atoms. In the compounds having formula (I), R is preferably methyl and $R_1$ a ter-alkyl. Methyl-terbutylether (MTBE) is particularly preferred.

The quantity of ethers which is used in the solvent mixture depends on the type of alcohol(s) used and generally ranges from 0 to 70% by weight, preferably from 10 to 60% by weight, with respect to the reaction solvent.

According to an embodiment of the process of the present invention, the reaction solvent can also contain one or more $C_5$–$C_{32}$ hydrocarbons.

These hydrocarbons are generally selected from paraffins, cyclo-paraffins or aromatic compounds.

Examples of paraffinic hydrocarbons are preferably selected from those having from 5 to 18 carbon atoms, and can be linear or branched.

Examples of said paraffinic hydrocarbons are n-hexane, n-heptane, n-octane, n-decane or their branched isomers.

Examples of cyclo-paraffinic hydrocarbons are cyclohexane, decaline or their derivatives substituted with one or more alkyl groups with from 1 to 6 carbon atoms. Typical examples of these compounds are methyl-cyclohexane, ethyl-cyclohexane or dimethyl-cyclohexane.

Aromatic hydrocarbons suitable for the purposes of the present invention are preferably selected from those having from 6 to 24 carbon atoms.

Examples of aromatic hydrocarbons are benzene, naphthalene, alkylbenzenes and alkylnaphthalenes with one or more alkyl chains, linear or branched, having from 1 to 18, preferably from 6 to 12 carbon atoms.

Examples of alkylbenzenes are toluene, xylenes (ortho, meta and para), ethylbenzene and cumene.

The quantity of hydrocarbons which is used in the reaction depends on the type of alcohol(s) used and generally ranges from 0 to 20% by weight, preferably from 0.1 to 10% by weight, with respect to the reaction solvent.

The acid promoter may be any substance capable of generating H$^+$ hydrogen ions in the reaction solvent and is generally selected from inorganic acids such as sulfuric, phosphoric, nitric acid or from organic acids such as sulfonic acids. Sulfuric acid and phosphoric acid are preferred.

The concentration of the acid generally ranges from 20 to 1000 mg per kg of reaction solvent and preferably from 50 to 500 mg per kg of reaction solvent.

The halogenated promoter can be any substance capable of generating halide ions in the reaction solvent. Substances capable of generating bromide ions are preferred. These substances are generally selected from hydrobromic acid and its salts soluble in the reaction medium, for example sodium bromide, potassium bromide, ammonium bromide or sodium bromate. Hydrobromic acid, sodium bromide and potassium bromide are particularly preferred.

The concentration of the halogenated promoter generally ranges from 0.1 to 50 mg per kg of reaction solvent and preferably from 1 to 10 mg per kg of reaction solvent.

The production of hydrogen peroxide is carried out by reacting oxygen and hydrogen in the reaction solvent in the presence of the catalyst and promoters and in the presence or absence of an inert gas selected from nitrogen, helium, argon. Nitrogen is the preferred gas.

The molar ratio $H_2/O_2$ in the feeding ranges from 1/1 to 1/100, preferably from 1/2 to 1/15 and the concentration of hydrogen in the gaseous phase in contact with the reaction solvent is conveniently maintained at a value lower than 4.5% molar, outside the explosivity limits of the mixture consisting of $H_2$, $O_2$ and, optionally, an inert gas.

According to an embodiment of the process of the present invention, the reaction can be carried out using air instead of pure oxygen.

The reaction is typically carried out at temperatures ranging from $-5°$ to $90°$ C., preferably from 2 to $50°$ C., a temperature ranging from 20 to $40°$ C. is particularly preferred, and at a total pressure higher than atmospheric pressure, preferably ranging from 10 to 300 bars, 30–100 bars being particularly preferred.

The process according to the present invention can be carried out batchwise or, preferably, in continuous using a reactor suitable for the purpose and selected from those described in the state of the art.

Operating under the above conditions, it is possible to produce hydrogen peroxide under safety conditions with a reaction productivity normally ranging from 30 to 200 g of $H_2O_2$ (expressed as $H_2O_2$ at 100%) per litre of reaction medium per hour and with a molar selectivity towards the formation of $H_2O_2$, referring to the hydrogen used up, ranging from 60% to 90%.

The solutions of hydrogen peroxide thus obtained can be used directly in oxidation processes which comprise the use of $H_2O_2$ without onerous intermediate processing such as the removal of acids and solvents.

Furthermore, the process of the present invention is suitable for the production of aqueous solutions of $H_2O_2$ having a commercial titer, by the removal of the organic components from the reaction medium, for example by distillation, which can be recycled to the synthesis.

The process of the present invention allows the reagents to be transformed into $H_2O_2$ with high conversions and selectivities, obtaining $H_2O_2$ solutions without acidity or containing only traces of acidity and/or salts.

The following examples, which have the sole purpose of describing the present invention in greater detail, should in no way be considered as limiting its scope.

EXAMPLE 1

Treatment of the Activated Carbon Carrier 150 g of activated carbon of maritime pine charcoal in powder form (CECA/2S/E) and 1500 ml of distilled water are charged into a 2 liter jacketed glass flask, thermostat-regulated with an oil-heated bath and equipped with a cooler and stirring. After 2 hours at $80°$ C., the activated carbon is filtered and washed with distilled water.

The activated carbon, still damp, is then charged into the 2 liter glass flask described above and after adding 1500 ml of a solution at 5% by weight of HCl, the temperature is brought to $80°$ C. After about 2 hours, the mixture is cooled and the activated carbon is washed on a filter with distilled $H_2O$ until the chlorides have been eliminated. The washed activated carbon is recovered and dried in an oven at $120°$ C. for 3 hours.

EXAMPLE 2 (COMPARATIVE)

Preparation of the Catalyst Pt—Pd/C (EX2)

(a) 900 ml of distilled water, 2.8 g of $Na_2CO_3$ and subsequently 80 g of activated carbon prepared in Example 1, are charged into a glass reactor, having the characteristics described in Example 1. The suspension is maintained at room temperature (20–25° C.), under stirring, for 10 minutes.

A solution of 8 g of $Na_2PdCl_4$ at 10% by weight of Pd in 100 ml of distilled water are subsequently added drop-wise over a period of about 10 minutes and the resulting suspension is kept at room temperature for 10 minutes and is then heated in a water bath for 10 minutes to $90°$ C. A solution containing 0.76 g of sodium formiate in 100 ml of distilled water is then added and the stirring is continued at $90°$ C. for 2 hours.

After cooling to room temperature, the suspension is filtered and the recovered catalyst is washed with distilled water until the chlorides have been eliminated and dried in an oven at $120°$ C. for 3 hours.

(b) the catalyst thus obtained is put in the 2 litre reactor described above and treated following the procedure described in (a), but using a solution of 0.404 g of $H_2PtCl_6$ (8% by weight of Pt) instead of the solution of $Na_2PdCl_4$.

After drying at $120°$ C., a catalyst is obtained (EX2) containing 0.97% of Pd and 0.038% of Pt on activated carbon.

EXAMPLE 3

Preparation of Activated Carbons Functionalized with Sulfonic Groups (C—$SO_3H$)

80 g of activated carbon prepared as described in Example 1 are charged into a jacketed 2 litre glass reactor, thermostat-regulated with an oil-heated bath and equipped with a cooler and stirring, and 240 g of $H_2SO_4$ at 96% are added dropwise in 20 minutes. After homogenizing the mixture with slight stirring, it is heated to $140°$ C. for 2 hours.

The mixture is cooled to room temperature and 200 g of crushed ice (from distilled water) are added in 10 minutes, the mixture is left to cool, a further 1000 ml of distilled water are added, the contents of the reactor are recovered and filtered. The activated carbon thus treated is washed until the sulfate ion in solution has been eliminated.

Upon elemental analysis, the activated carbon thus treated contains 0.38% of S.

EXAMPLE 4 (COMPARATIVE)

Preparation of the Catalyst Pd—Pt/C—$SO_3H$ (EX4)

The same procedure is adopted as described in Example 2, but using as carrier 8 g of activated carbon functionalized as specified in Example 3. The catalyst (EX4) is obtained, which upon analysis contains: 0.039% Pt; 0.98% Pd; 0.35% S.

EXAMPLE 5

Preparation of the Catalyst Pt—Pd/C+2.9% polySTY 8 g of the catalyst EX2 are charged into a 200 ml glass vacuum flask and flushed with nitrogen for 15 minutes to eliminate the air.

0.24 g of polystyrene (average MW 120000) are dissolved at 70° C. in a 100 ml Erlenmeyer flask containing 24 g of toluene. The resulting solution is then added dropwise in 5 minutes, maintaining the stream of nitrogen, into the flask containing the catalyst EX2. The flask containing the catalyst to which the polymer has been added is put under a rotating evaporator and is slowly reflux heated to 110° C. for 3 hours. The toluene is distilled under a slight vacuum, the catalyst is poured into a 100 ml glass and dried in an oven at 140° C. for 3 hours.

The catalyst (EX5) is obtained, containing upon analysis: (Pt—Pd/C)+2.9% polySTY (0.036% Pt; 0.94% Pd).

EXAMPLE 6

Preparation of the Catalyst Pt—Pd/C—$SO_3H$+3% polySTY (EX6)

The same procedure is adopted as described in Example 5, but using the catalyst EX4 prepared in Example 4.

The catalyst (EX6) is obtained containing upon analysis: Pt—Pd/C—$SO_3H$+3% polySTY (0.035% Pt; 0.93% Pd and 0.36% S).

EXAMPLE 7

Preparation of the Catalyst Pt—Pd/C($C_2$–co-$C_3$) (EX8)

The same procedure is adopted as described in Example 5, but using 0.24 g of 65% ethylene-35% propylene copolymer (EPR rubber) with an average molecular weight of 110000 instead of the polystyrene. The catalyst is obtained (EX8) containing upon analysis: Pt—Pd/(C+2.9% $C_2$–co-$C_3$) (0.036% Pt; 0.94% Pd).

EXAMPLE 8

Preparation of the Catalyst Pt—Pd/C—$SO_3H$($C_2$–co-$C_3$) (EX10)

The same procedure is adopted as described in Example 7, but using 8 g of the catalyst EX4 of Example 4. The catalyst is obtained (EX10) containing upon analysis: Pt—Pd/(C—$SO_3H$+2.9% $C_2$–co-$C_3$) (0.036% Pt; 0.95% Pd; 0.37% S).

EXAMPLES 9–10

Examples 5 and 6 are repeated using 0.24 g of butadiene-styrene copolymer (SBR: 75/25) with an average molecular weight of 120000 instead of the $C_2$-$C_3$ copolymer.

The catalysts (EX12 and EX14) are obtained respectively, containing upon analysis:
EX 12: Pt—Pd/(C+2.9% SBR) (0.036% Pt; 0.95% Pd).
EX 14: Pt—Pd/(C—$SO_3H$+2.9% SBR) (0.036% Pt; 0.94% Pd; 0.36% S).

EXAMPLES 11–18

Synthesis of Hydrogen Peroxide

A micropilot plant is used, consisting of a Hastelloy C autoclave having a volume of 400 ml, equipped with a thermostat-regulation system, a magnetic drag stirring system, a regulation and control system of the pressure during the reaction, a filter for continuously removing the liquid phase containing the reaction products, a feeding system of the mixture of solvent and promoters in which the reaction takes place, a feeding system of the gaseous reagents and a series of regulation and control instruments.

The reaction trend is followed by continuously analyzing the hydrogen and oxygen in the feeding and at the outlet of the reactor.

The concentration of $H_2O_2$ which is formed is determined in the liquid effluent of the reactor by titration with potassium permanganate. The selectivity with respect to the converted hydrogen is calculated on the basis of the concentration of $H_2O_2$ in the reaction effluent and on the basis of the analysis of the $H_2$ leaving the reactor, once the stationary state has been reached.

1.0 g of catalyst prepared as described in examples 2, 4 and 5–8 and 100 g of methanol:water solution (97/3 by weight) containing 6 ppm of HBr (6 mg/kg) and 200 ppm of $H_2SO_4$ (200 mg/kg) are charged into the reactor.

The autoclave is pressurized, without stirring, at 60 bars with a gaseous mixture consisting of 3.6% of $H_2$, 11% of $O_2$ and 85.4% of $N_2$. The stirring is then started up to 800 revs/minute, the pressure is maintained with a continuous stream, 916 normal liters (N1), of the same gaseous mixture, with the contemporaneous feeding of 400 g/hour of a methanol:water solution having the composition defined above and containing 6 ppm of HBr and 200 ppm of $H_2SO_4$. The temperature inside the reactor is maintained at 25° C.

The results obtained after 50 hours of reaction are indicated in Table 1.

TABLE 1

| Catalyst | $H_2O_2$ % | Selectivity % |
|---|---|---|
| EX2 Pt-Pd/C | 5.3 | 64 |
| EX4 Pt-Pd/C—$SO_3H$ | 5.7 | 70 |
| EX5 Pt-Pd/C + 3% polysty | 5.6 | 73 |
| EX6 Pt-Pd/C—$SO_3H$ + 3% polysty | 5.9 | 80 |
| EX8 Pt-Pd/(C + ($C_2$—co—$C_3$)) | 5.6 | 71 |
| EX10 Pt-Pd/(C—$SO_3H$+ ($C_2$—co—$C_3$)) | 6.0 | 78 |
| EX12 Pt-Pd/(C + SBR(25–75)) | 5.8 | 74 |
| EX14 Pt-Pd/((C—$SO_3H$ (SBR(25–75)) | 5.8 | 81 |

The invention claimed is:

1. A process comprising producing hydrogen peroxide from hydrogen and oxygen in a reaction solvent containing a halogenated promoter and/or an acid promoter, in the presence of a catalyst comprising:
    (a) one or more metals of the platinum group as active components;
    (b) one or more polyolefins; and
    (c) a carrier comprising activated carbon, wherein the active components are deposited on the carrier.

2. The process according to claim 1, wherein the metal components of the catalyst are selected from the group consisting of palladium, platinum, ruthenium, rhodium and iridium.

3. The process according to claim 2, wherein the metal components of the catalyst are palladium and platinum.

4. The process according to claim 3, wherein the quantity of palladium ranges from 0.01 to 4% by weight and the quantity of platinum ranges from 0.001 to 1% by weight, with an atomic ratio platinum/palladium ranging from 0.1/99.9 to 50/50.

5. The process according to claim 4, wherein the quantity of palladium ranges from 0.05 to 2% by weight and the quantity of platinum ranges from 0.005 to 0.5% by weight, with an atomic ratio platinum/palladium ranging from 1/99 to 30/70.

6. The process according to claim 3, wherein the catalyst additionally comprises at least one metal selected from the group consisting of ruthenium, rhodium, iridium and gold in a concentration not higher than that of the palladium.

7. The process according to claim 1, wherein the polyolefins have a molecular weight higher than 400 and are selected from the group consisting of:
homopolymers of ethylene and copolymers of ethylene with alpha olefins;
homopolymers of propylene and copolymers of propylene with alpha olefins;
homopolymers of butadiene and copolymers with styrene and other olefins;
homopolymers of isoprene and copolymers with other olefins;
ethylene/propylene (EPR) copolymers;
ethylene/propylene/diolefin (EPDM) terpolymers; and
thermoplastic elastomers deriving from butadiene and/or isoprene and styrene block copolymers, hydrogenated and non-hydrogenated.

8. The process according to claim 7, wherein the polyolefins are amorphous polyolefins.

9. The process according to claim 7, wherein the polyolefins are selected from the group consisting of rubbers and copolymers of butadiene-styrene (synthetic rubber; GRS, SBR); ethylene-propylene (EPM, EPR) copolymers; ethylene-propylene-diene copolymers (EPDM rubbers); styrene-butadiene-styrene (SBR thermoplastic rubbers); and isobutylene-isoprene (butyl rubbers).

10. The process according to claim 1, wherein the quantity of polyolefin ranges from 0.1 to 20% by weight with respect to the catalyst.

11. The process according to claim 10, wherein the quantity of polyolefin ranges from 1 to 10% by weight with respect to the catalyst.

12. The process according to claim 1, wherein the activated carbon has a surface area higher than 100 m$^2$/g.

13. The process according to claim 12, wherein the activated carbon has a surface, area higher than 300 m$^2$/g.

14. The process according to claim 13, wherein the activated carbon has a surface area higher than 600 m$^2$/g.

15. The process according to claim 1, wherein the catalyst is prepared by dispersing the active components on the carrier or pretreated with the one or more polyolefins by means of precipitation and/or impregnation.

16. The process according to claim 15, wherein component (a) contains at least two metals, the catalyst being prepared by dispersing in sequence and alternating the precursors of the single metal components of the catalyst on the carrier or pretreated with the one or more polyolefins.

17. The process according to claim 1, wherein the reaction solvent comprises one or more alcohols or a mixture of alcohol-water optionally containing an aliphatic ether and/or one or more $C_5$–$C_{32}$ hydrocarbons.

18. The process according to claim 17, wherein the alcohol is selected from the group consisting of those having from 1 to 6 carbon atoms.

19. The process according to claim 17, wherein the alcohol is selected from the group consisting of those having from 1 to 4 carbon atoms.

20. The process according to claim 19, wherein the alcohol is selected from the group consisting of methanol, ethanol, terbutanol (TBA) and their mixtures.

21. The process according to claim 20, wherein the alcohol is methanol.

22. The process according to claim 17, wherein the quantity of alcohol(s) ranges from 30 to 99% by weight with respect to the mixture.

23. The process according to claim 22, wherein the quantity of alcohol(s) ranges from 50 to 98% by weight with respect to the mixture.

24. The process according to claim 17, wherein the aliphatic ether is present, and is selected from the group consisting of those defined by general formula (I)

wherein R and $R_1$, the same or different, are alkyl groups having from 1 to 6 carbon atoms.

25. The process according to claim 24, wherein in the compounds having formula (I), R is methyl and $R_1$, a teralkyl.

26. The process according to claim 25, wherein the ether is methylterbutylether (MTBE).

27. The process according to claim 17, wherein the quantity of aliphatic ether having general formula (I) ranges from 0 to 70% by weight with respect to the reaction solvent.

28. The process according to claim 27, wherein the quantity of aliphatic ether having general formula (I) ranges from 10 to 60% by weight with respect to the reaction solvent.

29. The process according to claim 17, wherein the $C_5$–$C_{32}$ hydrocarbons are selected from the group consisting of paraffins, cyclo-paraffins and aromatic compounds.

30. The process according to claim 29, wherein the paraffinic hydrocarbons are present, and are linear or branched.

31. The process according to claim 30, wherein the paraffinic hydrocarbons are selected from the group consisting of those having from 5 to 18 carbon atoms.

32. The process according to claim 31, wherein the paraffinic hydrocarbons are selected from the group consisting of n-hexane, n-heptane, n-octane, n-decane and their branched isomers.

33. The process according to claim 29, wherein the cyclo-paraffinic hydrocarbons are present, and are selected from the group consisting of cyclohexane, decaline and their derivatives substituted with one or more alkyl groups having from 1 to 6 carbon atoms.

34. The process according to claim 33, wherein the substituted cyclo-paraffins are selected from the group consisting of methyl-cyclohexane, ethyl-cyclohexane and dimethyl-cyclohexane.

35. The process according to claim 29, wherein the aromatic hydrocarbons are present, and are selected from the group consisting of those having from 6 to 24 carbon atoms.

36. The process according to claim 35, wherein the aromatic hydrocarbons are selected from the group consisting of benzene, naphthalene, alkylbenzenes and alkylnaphthalenes with one or more linear or branched alkyl chains having from 1 to 18 carbon atoms.

37. The process according to claim 36, wherein the alkyl-benzenes or alkylnaphthalenes are present, and have a linear or branched alkyl chain having from 6 to 12 carbon atoms.

38. The process according to claim 37, wherein the alkyl-benzenes are present, and are selected from the group consisting of toluene, xylenes (ortho, meta and para), ethylbenzene and cumene.

39. The process according to claim 17, wherein the quantity of hydrocarbons ranges from 0 to 20% by weight with respect to the reaction solvent.

40. The process according to claim 39, wherein the quantity of hydrocarbons ranges from 0.1 to 10% by weight with respect to the reaction solvent.

41. The process according to claim 1, wherein the catalyst is used at a concentration ranging from 0.1 to 10% by weight with respect to the reaction solvent.

42. The process according to claim 41, wherein the catalyst is used at a concentration ranging from 0.3 to 3% by weight with respect to the reaction solvent.

43. The process according to claim 1, wherein the acid promoter is present, and is selected from the group consisting of substances capable of generating $H^+$ hydrogen ions in the reaction solvent.

44. The process according to claim 43, wherein the acid promoter is selected from the group consisting of inorganic acids.

45. The process according to claim 44, wherein the acid promoter is sulfuric acid or phosphoric acid.

46. The process according to claim 1, wherein the concentration of acid promoter ranges from 20 to 1000 mg per kg of reaction solvent.

47. The process according to claim 46, wherein the concentration of acid promoter ranges from 50 to 500 mg per kg of reaction solvent.

48. The process according to claim 1, wherein the halogenated promoter is present, and is selected from the group consisting of substances capable of generating halogen ions in the reaction solvent.

49. The process according to claim 48, wherein the halogenated promoter is selected from the group consisting of compounds capable of generating bromide ions.

50. The process according to claim 49, wherein the compound is hydrobromic acid, sodium bromide or potassium bromide.

51. The process according to claim 1, wherein the concentration of halogenated promoter ranges from 0.1 to 50 mg per kg of reaction solvent.

52. The process according to claim 51, wherein the concentration of halogenated promoter ranges from 1 to 10 mg per kg of reaction solvent.

53. The process according to claim 1, wherein the reaction is carried out at a temperature ranging from −5 to 90°C.

54. The process according to claim 53, wherein the temperature ranges from 2 to 50°C.

55. The process according to claim 54, wherein the temperature ranges from 20 to 40°C.

56. The process according to claim 1, wherein the reaction is carried out at a total pressure higher than atmospheric pressure.

57. The process according to claim 56, wherein the total pressure ranges from 10 to 300 bars.

58. The process according to claim 57, wherein the total pressure ranges from 30 to 100 bars.

59. The process according to claim 1, wherein the molar ratio hydrogen/oxygen in the feeding ranges from 1/1 to 1/100.

60. The process according to claim 59, wherein the molar ratio hydrogen/oxygen in the feeding ranges from 1/2 to 1/15.

61. The process according to claim 1, wherein the reaction is carried out in the presence of an inert gas selected from the group consisting of nitrogen, helium, and argon.

62. The process according to claim 61, wherein the inert gas is nitrogen.

63. The process according to claim 1, wherein the concentration of hydrogen in the gaseous phase in contact with the reaction solvent is maintained at a value lower than 4.5% molar.

64. The process according to claim 1, wherein the reaction is carried out using air as oxygen source.

65. The process according to claim 1, wherein the reaction is carried out batchwise or in continuous.

66. The process according to claim 1, wherein the solution of hydrogen peroxide is used directly in an oxidation process of a substrate selected from the group consisting of olefins, aromatic hydrocarbons, ammonia and carbonyl compounds, using titanium silicalite as catalyst.

67. The process according to claim 1, wherein organic components are removed from the reaction medium, whereby an aqueous solution of hydrogen peroxide is obtained, and the organic components are optionally recycled to the synthesis.

68. The process according to claim 44, wherein the acid promoter is sulfuric, phosphoric, or nitric acid.

69. The process according to claim 44, wherein the acid promoter is a sulfonic acid.

70. The process according to claim 49, wherein the compound is ammonium bromide or sodium bromate.

* * * * *